United States Patent [19]
Dixon et al.

[11] 4,437,343
[45] Mar. 20, 1984

[54] AIRSPEED SENSING SYSTEMS

[75] Inventors: James M. Dixon, Lymington; Geoffrey R. Witt, Dorset, both of England

[73] Assignee: Penny & Giles Transducers Limited, United Kingdom

[21] Appl. No.: 359,800

[22] Filed: Mar. 19, 1982

[30] Foreign Application Priority Data

Mar. 24, 1981 [GB] United Kingdom ............... 8109242

[51] Int. Cl.³ ............................................. G01C 21/10
[52] U.S. Cl. ................................. 73/182; 73/861.61
[58] Field of Search ........... 73/861.61, 861.62, 861.63, 73/861.64, 861.52, 182, 183, 189

[56] References Cited

U.S. PATENT DOCUMENTS 2,585,290 2/1952 Walker ............................. 73/861.61
3,822,592 7/1974 Siegel et al. ..................... 73/861.61

Primary Examiner—Donald O. Woodiel
Attorney, Agent, or Firm—Lewis H. Eslinger

[57] ABSTRACT

A cylindrical tube is open at both ends but divided into two portions by a barrier having an aperture therein. Side branches are connected to the tube either side of the barrier respectively, the side branches leading to a pressure transducer for deriving an airspeed indication. One open end of the tube is arranged to face into an airflow so that a pressure difference exists between the two portions, the pressure difference being measured by the pressure transducer through side branches. The barrier may have no aperture, the portions then being connected by a restricted passage disposed between the sides of the portions or between the side branches. The outside air temperature may be derived by the provision of a resistive element within the restricted passage.

4 Claims, 3 Drawing Figures

AIRSPEED SENSING SYSTEMS

BACKGROUND OF THE INVENTION

1. Field of the Invention

This invention relates to airspeed sensing systems.

2. Description of the Prior Art

The airspeed sensing systems currently used on fixed-wing aircraft commonly comprise a pitot tube and a pressure transducer arrangement which provides analog electrical signals representing the pitot pressure and the static pressure. Corrections are applied to these signals in dependence on the air temperature, and the true airspeed can be computed using a formula of the type:

$$T.A.S. = fn(P-S) \cdot fn(S) \cdot fn(\theta m)$$

where

T.A.S. is the true airspeed
P is the pitot pressure
S is the static pressure $\theta$ m is the measured outside air temperature.

An alternative approach is to use a venturi and to measure the pressure differential which it creates.

There are several problems with such airspeed sensing systems. Thus, for example, care has to be taken to mount them on the aircraft at a position which is exposed to a representative and reasonably non-turbulent airflow. These problems become even more serious in the cases of helicopters, vertical take-off and landing (VTOL) aircraft and hovercraft. In the case of helicopters, for example, the rotor blades have a very substantial effect on the air flow around the fuselage and in fact cause a downwash effect with resultant pulsating pressure changes.

SUMMARY OF THE INVENTION

One object of the present invention is to provide an improved airspeed sensing system.

Another object of the present invention is to provide an airspeed sensing system suitable for use on a helicopter.

Another object of the present invention is to provide an airspeed sensing system sensitive to airflow in either of two opposite directions.

According to the present invention there is provided an airspeed sensing system comprising:

a tube arrangement which in use is exposed to airflow and which has a first open-ended portion to face substantially directly into said airflow and a second open-ended portion to face in substantially the opposite direction;

a restricted passage through which a portion of the air entering said first portion can leak from said first portion to said second portion; and means for obtaining an airspeed indication in dependence on the pressures in said first and second portions respectively.

The tube arrangement may comprise a single straight tube closed by a central barrier which divides the tube into said first and second portions, or two separate tubes preferably aligned with one another. Preferably first and second side branches are connected to said first and second portions respectively, and the airspeed indication is obtained in dependence on measurements of the pressures in said first and second portions and derived through said first and second side branches.

The restricted passage may be an aperture formed in said barrier, the diameter of the aperture being small relative to the diameter of the tube. However, such an aperture is liable to become obstructed by the aggregation of foreign matter present in the airflow or by icing. Preferably, therefore, said restricted passage is in the form of a passage connecting said first and second portions or said first and second side branches, the diameter of the passage being small relative to the diameter of the first and second portions.

As the measurement of true airspeed requires measurement of the air temperature, it is convenient to provide a resistance element within the restricted passage.

Preferably the tube arrangement is end-for-end symmetrical.

The principle of operation has features in common both with the pitot tube and the venturi arrangements described above. The effect of the restricted passage is to cancel the drag effect which would otherwise give a false value of static pressure in the second portion of the tube arrangement. This means that a pitot pressure and a "psuedostatic" pressure can be derived from the first and second portions respectively of the tube arrangement.

Additionally, embodiments of the invention can have a high common mode rejection. What this means is that if the airflow to which the tube arrangement is exposed has components normal to the direction in which the open ends of the first and second portions of the tube arrangement face, the effect of these components will tend to cancel out. This is of particular advantage, for example, in the case of downwash from the rotor blades of a helicopter. Moreover, embodiments of the invention which are end-for-end symmetrical will be bi-directional in response.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
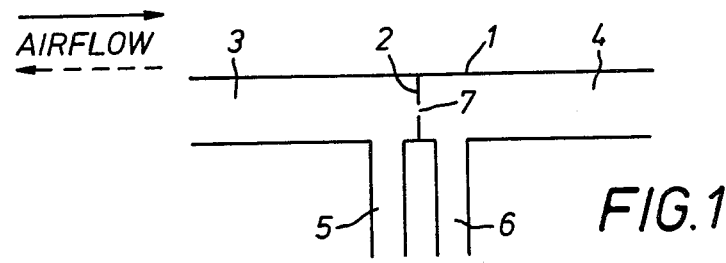
FIG. 1 shows a diagrammatically cross-sectional view of part of a first embodiment of airspeed sensing system according to the invention.

Referring to FIG. 1, the first embodiment of airspeed sensing system comprises a tube arrangement formed by a straight circular cylindrical tube 1 which is open at both ends and closed at the centre by a barrier 2 so as to form a first open-ended portion 3 and a second open-ended portion 4. The tube arrangement is end-for-end symmetrical and in use the open end of the portion 3 is arranged to face substantially directly into an airflow, so that the portion 4 is facing in substantially the opposite direction to the airflow.

Side branches 5 and 6 are connected to the portions 3 and 4 respectively and lead to a pressure transducer arrangement for deriving an airspeed indication in dependence on the presssures in the portions 3 and 4. A controlled leak in the form of an aperture 7 in the barrier 2 and of small diameter relative to the diameter of the tube 1 provides a restricted passage through which a fraction of the air entering the portion 3 can leak to the portion 4. The effect of this leakage of air is to counteract the drag effect which would otherwise reduce the static pressure measurement obtained from the portion 4, and results in a "psuedostatic" pressure in the portion 4. In deriving the airspeed indication this psuedostatic pressure S' is used in place of the static pressure S in the formula given above, while the pitot pressure P is derived from the portion 3 in the usual way. As discussed above this arrangement has a high common mode rejection and when the tube 1 is end-for-end symmetrical the response is bi-directional. Thus an indication can be obtained when the portion 4 is facing into the airflow and in this case leakage of air through the aperture 7 is in the opposite direction. For these reasons embodiments of the invention are particularly suitable for use on vehicles such as helicopters, VTOL aircraft and hovercraft.

There is some risk of the aperture 7 becoming clogged due to particles of foreign matter in the airflow or icing, but these difficulties can be overcome in the second embodiment described below.

Figure 2:
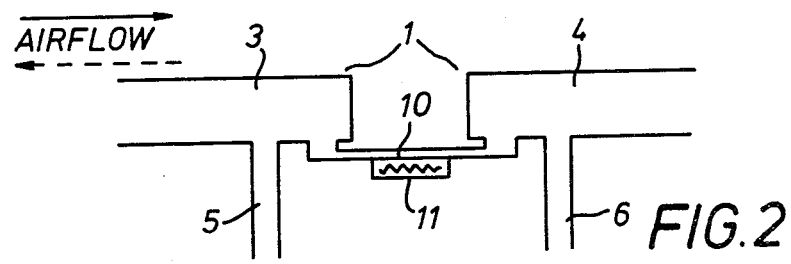
FIG. 2 shows a diagrammatic cross-sectional view of a second embodiment of airspeed sensing system according to the invention.

Referring to FIG. 2, the second embodiment shown therein differs from the first in that the portions 3 and 4 of the tube 1 are distinct. In the figure they are shown to be separate, but obviously the same effect can be achieved simply by making the barrier 2 of FIG. 1 solid. In this embodiment the controlled leak is by way of a restricted passage 10 extending from near the closed end of the portion 3 to near the closed end of the portion 4. An alternative, but less preferred arrangement, is for the restricted passage 10 to connect the side branch 5 to the side branch 6.

To derive the true airspeed, a measure of the outside air temperature is required, and this can be derived by providing a resistance element 11 within the restricted passage 10.

Figure 3:
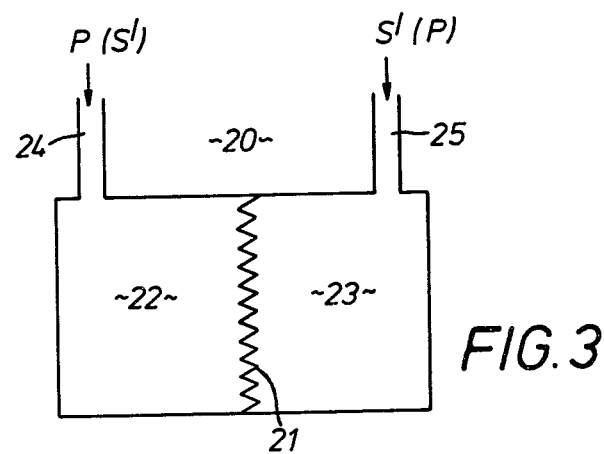
FIG. 3 shows another part of the first or second embodiment in diagrammatic form.

Referring to FIG. 3, this shows diagrammatically a transducer arrangement from which an indication of airspeed can be obtained. Either of the above-described embodiments will provide a pitot pressure P and a psuedostatic pressure S' as required by the above formula. However, whether these pressures are available in the side branch 5 and the side branch 6 respectively or vice versa, will depend on the direction of the airflow, so the transducer arrangement needs to have a symmetrical response. Any transducer arrangement having this feature can be used. The example shown in FIG. 3 comprises an air-tight chamber 20 divided by a central flexible diaphragm 21 into sub-chambers 22 and 23 which are connected by way of tubes 23 and 24 to the side branches 5 and 6 respectively. The sub-chambers 22 and 23 are therefore exposed to the pressures in the portions 3 and 4 respectively of the tube 1 and a measure of the airspeed on the airflow can be obtained in dependence on the movement of the diaphragm 21 using known techniques.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. An airspeed sensing system comprising:
a tube arrangement which in use is exposed to airflow, said tube arrangement including a first tube and a second tube aligned with one another, said first tube having a first open-ended portion to face substantially directly into said airflow and said second tube having a second open-ended portion to face in substantially the opposite direction;
a restricted passage connecting said first and second portions, the diameter of said passage being small relative to the diameters of said first and second portions;
a resistive element disposed within said restricted passage for the purpose of deriving a temperature measurement; and
means for obtaining an airspeed indication in dependence on pressures in said first and second portions, respectively.

2. An airspeed sensing system according to claim 1 wherein first and second side branches are connected to said first and second portions respectively.

3. An airspeed sensing system according to claim 2 wherein the airspeed indication is obtained in dependence on measurements of the pressures in said first and second portions and derived through said first and second side branches.

4. An airspeed sensing system according to claim 1 wherein said tube arrangement is end-for-end symmetrical.

* * * * *